H. H. STYLL.
OPHTHALMIC LENS.
APPLICATION FILED AUG. 23, 1920.
1,359,204.
Patented Nov. 16, 1920.
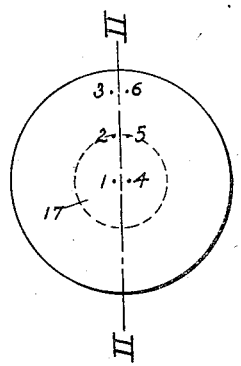 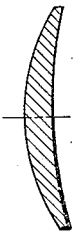 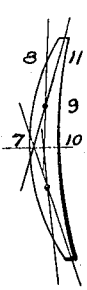 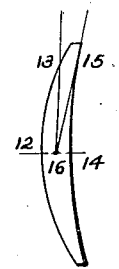
FIG. I     FIG. II     FIG. III     FIG. IV
INVENTOR
H. H. STYLL
BY
H. H. Styll & A. H. Parsons
ATTORNEYS

UNITED STATES PATENT OFFICE.

HARRY H. STYLL, OF SOUTHBRIDGE, MASSACHUSETTS.

OPHTHALMIC LENS.

1,359,204.   Specification of Letters Patent.   Patented Nov. 16, 1920.

Original application filed June 23, 1919, Serial No. 306,117. Divided and this application filed August 23, 1920. Serial No. 405,312.

*To all whom it may concern:*

Be it known that I, HARRY H. STYLL, a citizen of the United States, residing at Southbridge, in the county of Worcester and State of Massachusetts, have invented certain new and useful Improvements in Ophthalmic Lenses, of which the following is a specification.

This invention relates to ophthalmic lenses corrected to give substantially correct vision as regards both focus and astigmatism throughout the entire normal field of vision and is a division of my application filed June 23, 1919, Serial No. 306,117.

The principal object of this invention is to provide means to relate the opposite faces of the lens in such a way as to produce a minimum variation from the correct powers of focus and astigmatism of the lens at any one position within the normal field of vision.

Another object of this invention is to provide a way to reduce a large variation from the desired powers at any point or points within the normal field of vision by introducing or adding permissible errors at some other point or points within the normal field of vision so that the variations at all points within the normal field of vision will fall within a permissible amount, that is to say, to produce a lens that while it may not be absolutely correct at any point, yet as a whole shall have no variations from correct powers that do not fall within a permissible amount.

Other objects and advantages of the invention will be readily apparent by reference to the following specification taken in connection with the accompanying drawings, and it will be understood that I may make any modifications in the specific details of construction or steps shown and described within the scope of the appended claims without departing from or exceeding the spirit of my invention, the preferred form only having been shown and described for sake of illustration.

To facilitate an understanding of the features hereinafter referred to, I have appended a sheet of drawings illustrative of the same. Similar references throughout the specifications and drawings refer to similar parts.

Figure I represents a face or front view of an ophthalmic lens.

Fig. II represents a sectional view on line II—II of Fig. I.

Fig. III represents a diagrammatic sectional view on line II—II of Fig. I.

Fig. IV also represents a diagrammatic sectional view on line II—II of Fig. I.

The normal angle of human vision is about sixty degrees. The usual marginal errors or abberations encountered in ophthalmic lenses are those of focus or spherical power, and those of astigmatism or cylindrical power, and these abberations cause errors in both magnification and in displacement of the image of the object.

Lenses hitherto have been corrected in the marginal portions both for spherical and cylindrical abberations, but in all such lenses the calculations have been made for a lens of correct central or vertex power; that is to say, the center was made to the desired power and the errors were corrected from this point out to the margin of the lens, therefore being increasingly greater as they receded from the center toward the edge of the lens. This is best illustrated in Fig. IV, where it will be noted the angle 16—13—15 diverges from the central point 16.

In this invention the central or vertex point is not held as a fixture; in fact there is no fixed point in the lens, but on the other hand the calculations are based on a point somewhere within the normal field of vision that will produce the smallest variations possible at all points within the field. In fact errors may be introduced at points of no error, or small error, to aid in reducing down or averaging up greater errors at other points, so that at no point will the errors be greater than an amount permissible to vision.

The old art lenses were correct at one point and departed as little as possible therefrom at other points, but in this invention the idea is to get an average lens that as a whole gives better results because at no point is the error great enough to be injurious to vision.

This is best shown by referring to the drawings. In Fig. I are shown central, intermediate and marginal powers of focus and astigmatism. 1 indicates the central power of focus; 2 the intermediate power of focus; 3 the marginal power of focus; 4 the central astigmatism; 5 the intermediate astigmatism, and 6 the marginal astigmatism.

It will be seen that here we have six elements or powers we may adjust and position to give the nearest approach to the desired powers. By taking some intermediate position, such as 9 in Fig. III, we can proceed both ways in our adjustments instead of only one way, as in Fig. IV. From 9 we can adjust toward both the margin and the center until we arrive at a position where the average departure is a minimum for every point in the field of vision, whereas in Fig. IV we can only proceed from the center 16 toward the marginal points 13 and 15, giving a much wider divergence at the margin than would be obtained in Fig. III, working to both sides of an intermediate point. The divergence of the angles 9—7—10 and 9—8—11, Fig. III, is considerably less than that of the angle 16—13—15 of Fig. IV, as the distance 16—13 is practically double that of the distance 8—9 or 9—10.

While I have referred to selecting the point 9, since it is easiest to show diagrammatically the result desired or intended in this manner, it is to be understood that in the actual production of the lens what is done is to select not a single point but a line, preferably concentric with the center 1 of the lens, this line being shown as a dash or dot line 17 in Fig. I of the drawings and including the points 2 and 5 previously referred to. The calculations for the lens will ordinarily be made so that this line, preferably though not necessarily circular in form, will contain the several points in the lens of correct power, while the lens within and without this line will vary but slightly from said correct power so that the variations from the correct power will at both sides be but slight and will be less than the variations found to be present in types of centrally corrected lenses which attempts have hitherto been made to produce, and the variation will thus be kept below what may be termed permissible error or an error which, while measurable by scientific instruments or the like, is so slight as to remain unnoticed by the eye of the user of the lens. Having six elements which may be varied, adjustments with these may be made whereby an average lens of the lowest possible variation can be produced. No one of all the six elements is to be considered as fixed but they are to be left free to enter the resultant equation of minimum variation of the visual field as a whole.

The processes of making these lenses are the usual processes of making ordinary commercial ophthalmic lenses, and the calculations are made in the same way, only using the intermediate line 17, Fig. I as a basis, instead of the central point 16, Fig. IV as has hitherto been done.

The lenses also can be made individually to a prescription, each face being calculated for the particular prescription, or they may be made in series, wherein one face for several powers of lenses is a constant, and the other side a variable. When made in series blanks ground on the constant side may be sold to the dealer, and the dealer can put the second side on to get the required prescription.

When ground in series the power of the face curves is suitably marked on the lens or container, and a chart is furnished the dealer showing the curve of the second side to give the required prescription. Tools also for grinding the second side are prepared and sold to the dealer. Each tool is numbered and marked to indicate the curve of its face. These tools are the ordinary lap tools. The charts show the constant curves, the variable curves, and the tool numbers.

This lens when produced in the series method can be supplied the patient as quickly and practically and as cheaply as the old commercial uncorrected ones.

The amount of permissible variation may be fixed at any desired predetermined standard satisfactory to the oculist. The one usually used, however, is that amount by which ophthalmic lenses vary from each other in the commercial series. At some portions of the range this is one-eighth of a diopter; at others a quarter, and so on, even up to one whole diopter in very strong curves, gradually increasing from the weak to the stronger curves. The amount, therefore, most practicable to select would be that by which corresponding ophthalmic lenses vary from each other in their corresponding section of the ophthalmic range of powers.

I claim:

1. As an article of manufacture an ophthalmic lens having a line intermediate the center and edge of the prescribed power and having the center and edge powers varying from said line but by a less amount than the unit of measure of difference between the lens in question and the adjacent lenses of a standard lens series.

2. As an article of manufacture an ophthalmic lens having its opposite faces related to produce a line of prescribed power about the center of the lens and intermediate the center and edge and having the center and edge portions of substantially corresponding powers differing by a prescribed amount from the said line.

3. As an article of manufacture an ophthalmic lens having a line concentric with the lens center of prescribed power and an inclosed central portion varying from the prescribed power by less than a predetermined amount.

4. An improved lens having front and rear curved faces, said faces being related to produce an intermediate line inclosing the center of the lens and approximating the power prescribed whereby the inherent error of the lens is averaged between the central inclosed and marginal surrounding portions of the lens substantially as and for the purpose described.

In testimony whereof I have affixed my signature, in presence of a witness.

HARRY H. STYLL.

Witness:
H. K. PARSONS.